Dec. 27, 1927.
J. MacKAY
1,653,639
FAUCET
Filed July 14, 1925
3 Sheets-Sheet 1
FIG. I.
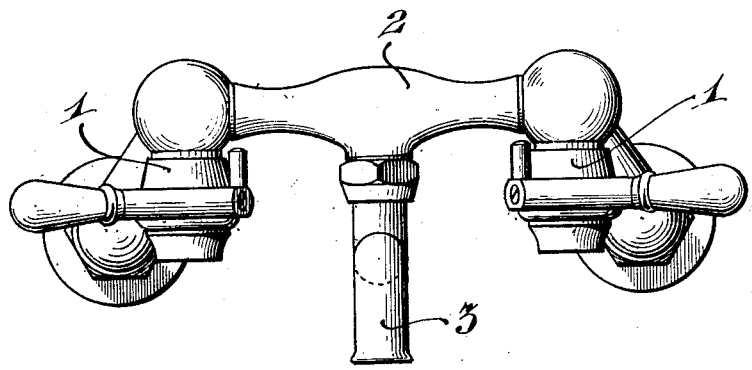
FIG. II.
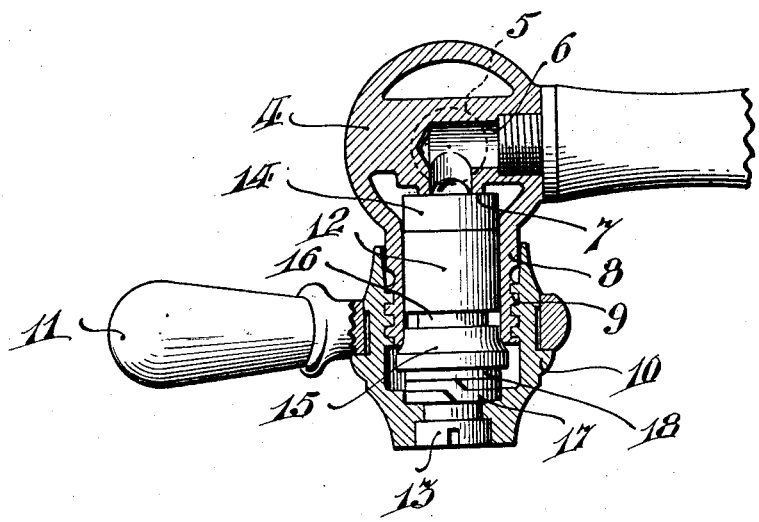
INVENTOR
John MacKay
BY
Joshua R H Toth
ATTORNEY Dec. 27, 1927.  1,653,639
J. MacKAY
FAUCET
Filed July 14, 1925   3 Sheets-Sheet 2
FIG. III
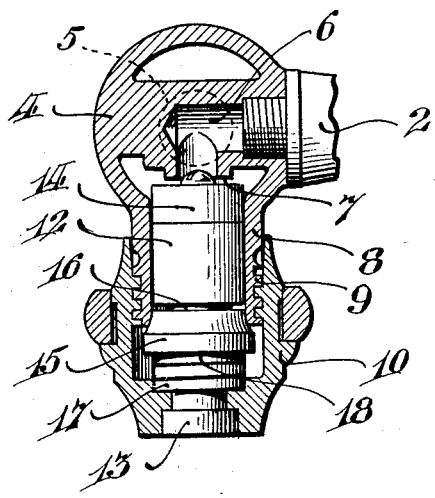
FIG. IV
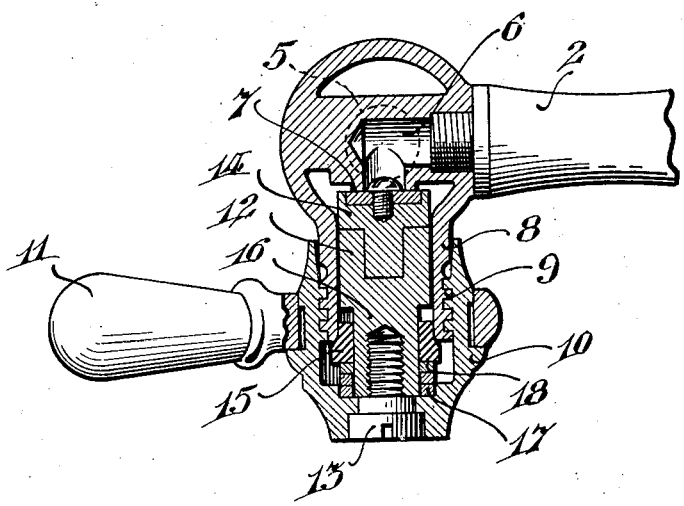
WITNESSES:
Alfred E. Fischinger
George A. Gruss
INVENTOR
John MacKay,
BY
Joshua R H Potts
ATTORNEY Dec. 27, 1927.　　　　　　　　　　　　　　　　1,653,639
J. MacKAY
FAUCET
Filed July 14, 1925　　　　　　　3 Sheets-Sheet 3
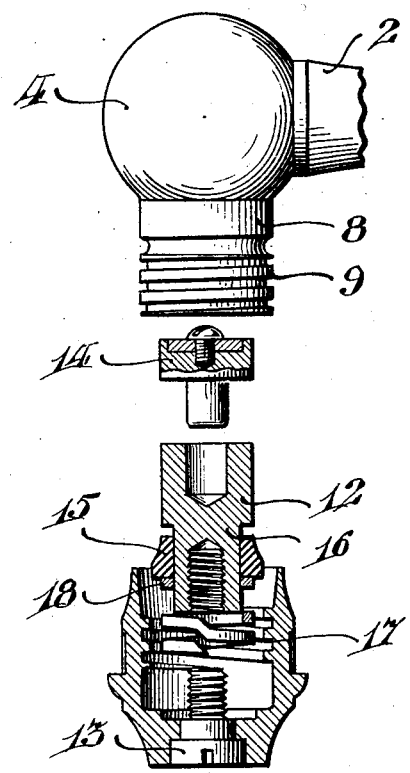
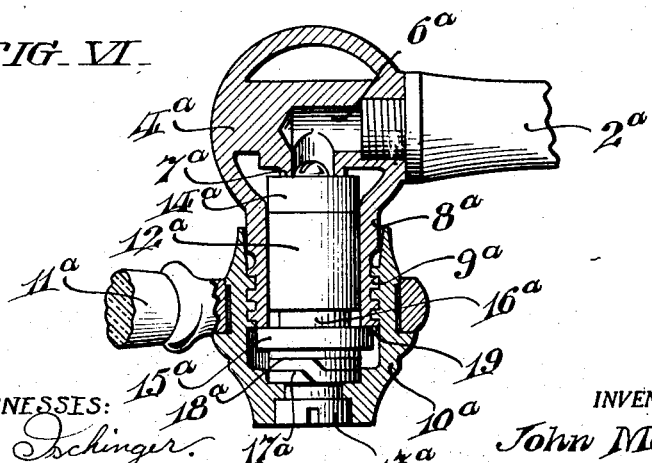

Patented Dec. 27, 1927.

1,653,639

UNITED STATES PATENT OFFICE.

JOHN MacKAY, OF AUDUBON, NEW JERSEY, ASSIGNOR TO THOMAS SAVILL'S SONS, OF PHILADELPHIA, PENNSYLVANIA.

FAUCET.

Application filed July 14, 1925. Serial No. 43,519.

My invention relates to faucets and more particularly to means for sealing the faucets against leakage.

Hot and cold water faucets of the standard nozzle-like type generally used in sinks have their outlet passage in a single bib instead of in separate nozzles under their respective valves. The objection to such faucets is that the valves are apt to leak when the faucet is open.

The objects of my invention are to provide means for stopping the leakage in faucets of this type; to so arrange the parts that they will be subject to practically no wear, and that they will automatically adjust themselves to maintain a seal at all times.

These objects, and other advantageous ends which will be described hereinafter, I attain in the following manner, reference being had to the accompanying drawings in which Figure 1 is a front elevation of a pair of faucets having my invention applied thereto, Figure 2 a fragmentary central section through one of the faucets showing some of the parts in full, Figure 3 a view similar to Figure 2 showing the parts in another position, Figure 4 a view similar to Figure 2 showing all of the parts in section, Figure 5 a disassembled view of the parts shown in Figure 4 showing some of them in full, and Figure 6 a view similar to Figure 2 of a modified form.

Referring to Figures 1-5 of the drawings, 1 indicates a pair of faucets having their outlet passages in a single bib 2 which has a water spout 3. Each faucet has a casing 4 provided with an inlet 5, an outlet 6, a seat 7 between the inlet and outlet and an extension 8 having external threads 9. A head 10 threaded on extension 8 and having a handle 11 secured thereto, has a stem 12 rotatably fastened thereto by a shouldered screw 13. Stem 12 movably fits within extension 8 and carries a disk 14 which is adapted to engage seat 7 to close the faucet. By turning handle 11, the threaded connection of head 10 with extension 8 will cause stem 12 and disk 14 to move toward or away from seat 7 to close or open the faucet. To prevent leakage of water through the clearance space between the stem and the inner wall of extension 8, I provide a gasket 15, fitting tightly between a reduced part 16 of the stem and the inner wall of extension 8. The gasket is preferably of frusto-conical shape and of compressible material such as rubber. A spring 17 keeps the gasket in sealing position and a wearing washer 18 protects the gasket against frictional wear by the spring.

In Figure 6, I have shown a washer $15^a$ of rectangular cross section adapted to abut the end face 19 of extension $8^a$. In all other respects the faucet is similar to the one shown in Figures 1-5 and I have therefore given corresponding parts similar reference characters with the exponent "a".

I have shown spring 17 which holds gasket 15 in sealing position, as bearing on head 10, but it might have its bearing in another part such as a projecting part of stem 12 or a depending part of extension 8, the essential factor being that it shall have a bearing.

In assembling the parts, gasket 15, wearing washer 18 and spring 17 are slipped over reduced part 16 of the stem, after which the stem is attached to head 10 by shouldered screw 13. The shoulder of this screw prevents it from binding the head to the stem and allows the stem to rotate. Disk 14 is then placed on the stem and the head screwed onto the threaded extension 8. Handle 11 is then adjusted to be in proper position when the valve is closed.

To open the valve, head 10 and handle 11 are turned so that stem 12 and disk 14 will move away from seat 7. During this movement, spring 17 will open up and hold gasket 15 in sealing position as shown in Figure 3. Wear on the gasket due to any rotary movement imparted to the spring by its frictional contact with head 10, is prevented by wearing washer 18. The tension in spring 17 when in the open position shown in Figure 3 is sufficient to compress the gasket to make a seal and allow the stem to slide within the gasket.

The sealing gasket above described receives practically no wear from the parts in contact therewith and is automatically adjusted for wear to maintain a seal at all times.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a faucet having an extension, a stem movable in the extension to open and close the faucet, and means threaded to the extension for moving the stem; a gasket for sealing the space between the stem and the extension, and means enclosed by the first mentioned means for keeping the gasket in sealing position, said stem and first means being adapted to be simultaneously disconnected from the faucet.

2. In a faucet having an extension, a stem movable in the extension to open and close the faucet, a seating disk rotatably mounted on the stem, and means threaded to the extension for moving the stem; a gasket for sealing the space between the stem and the extension, and means connected with the stem and enclosed by the first mentioned means for keeping the gasket in sealing position, said stem being removed from the faucet by the unthreading of said means on the extension.

3. In a faucet having an extension and a stem movable in the extension; means connected with the stem and threaded to the extension for opening and closing the faucet; means for sealing the space between the stem and the extension, said stem and first means being adapted to be removed from the faucet simultaneously.

4. In a faucet having an extension and a stem movable in the extension; means connected with the stem and threaded to the extension for opening and closing the faucet; means for sealing the space between the stem and the extension, and a resilient element carried by the first mentioned means for keeping the gasket in sealing position, the unthreading of said means from the extension causing the removal of the stem from the faucet.

5. In a faucet having an extension and a stem movable in the extension; a seating disk rotatably mounted on the stem; means connected with the stem and the extension for opening and closing the faucet; said means being adapted to be disconnected from the extension and simultaneously remove said stem.

6. In a faucet having an extension and a stem movable in the extension; a seating disk rotatably mounted on the stem; means connected with the stem and threaded to the extension for opening and closing the faucet; means for sealing the space between the stem and the extension, and a resilient element connected with the stem and enclosed by the first mentioned means for keeping the gasket in sealing position, the unthreading of said first means from the extension causing the removal of the stem.

7. A faucet having an extension and a head threaded to the extension; a stem carried by and rotatable in the head and movable in the extension to open and close the faucet; a seating disk rotatably mounted on the stem; means through the head connecting said stem and head, said means being adapted to allow said stem to rotate within the head.

8. In a faucet a casing having an inlet and an outlet; a seat between said inlet and outlet; an extension from the casing threaded externally; a removable head adapted to be mounted by threading to said extension; a stem rotatably fastened at one end to the head and adapted to fit within the extension when the head is threaded thereto; means on the other end of the stem for bearing against said seat to open and close said outlet; a lever on the head for rotating the stem to control said means; a sealing means on the stem to prevent leakage between the stem and the extension; resilient means bearing upon said sealing means regardless of the position of said stem within the extension; and wearing means between the sealing means and the resilient means to protect said sealing means against frictional wear of the resilient means.

9. In a faucet a casing having an inlet and an outlet; a seat therebetween, an extension integral with said casing and surrounding said outlet, said extension being threaded on the outside, a demountable head adapted to be screwed on the extension, a stem having a disc mounted on one end, the other end being rotatably fastened to the head by a screw, whereby upon screwing the head on the extension the disc will bear against the seat of the outlet, means on the head for rotating the head to cause the disc to open or close the outlet, sealing means for preventing leakage between the extension and the head, and a spring for preserving the seal when said outlet is either open or closed, and means for protecting said sealing means from the wearing action of said spring.

10. In a faucet three units, a first unit having an inlet and an outlet, a seat therebetween, and an externally threaded extension; a second unit having a removable head externally threaded to fit said extension and a handle integral with the outer side of the head; a third unit having a stem with a gasket and bearing spring mounted on one end thereof and means between the gasket and spring to prevent frictional wear of the spring on the gasket, a disc mounted on the other end of the stem; said units being so adapted that upon fastening said stem in said head by a rotatable means, the stem will be adapted to rotate and not bind with the head, and upon screwing the head on the extension by said handle the disc on the stem will close said opening, said gasket and spring being so disposed that an effective seal will be preserved between said stem and extension when said handle is operated to cause said disc to open or close the opening.

11. A faucet comprising three units, a first unit containing the inlet and outlet passages of the faucet, a seat therebetween, and an externally threaded extension, a second unit consisting of a removable internally threaded shell adapted to be mounted by threading on said extension by means of an outer handle integral therewith, and a third unit held within the second unit by a screw accessible from without the faucet, said third unit having an innermost cap for bearing against the seat in said first unit and a spring pressed washer for preserving a seal between said first and second units at a point below the terminating lower portion of the threaded section of the first unit.

In testimony whereof I have signed my name to this specification.

JOHN MacKAY.